Figure 1:
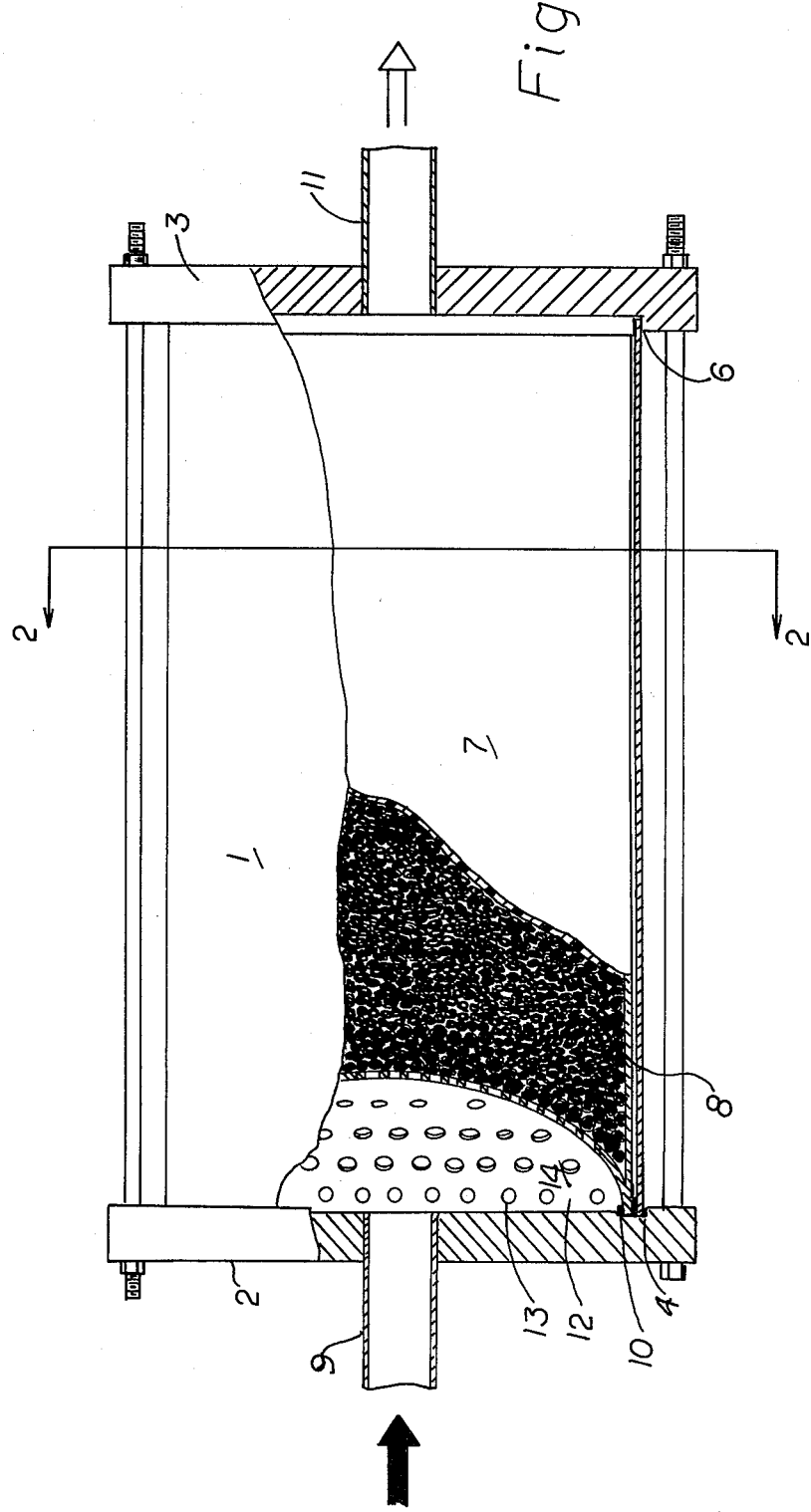

United States Patent [19]

Duke

[11] 4,378,293

[45] Mar. 29, 1983

[54] WATER FILTER

[76] Inventor: Don T. Duke, 2218 Stonehurst Dr., Louisville, Ky. 40222

[21] Appl. No.: 53,591

[22] Filed: Aug. 8, 1979

Related U.S. Application Data

[63] Continuation-in-part of Ser. No. 886,246, Apr. 4, 1978, abandoned.

[51] Int. Cl.³ .............................................. B01D 27/02
[52] U.S. Cl. .................................... 210/282; 210/289; 210/291
[58] Field of Search .......................... 210/282, 289, 291

[56] References Cited

U.S. PATENT DOCUMENTS

| | | | |
|---|---|---|---|
| 693,493 | 2/1902 | Burger et al. | 210/291 |
| 1,223,460 | 4/1917 | Widner | 210/289 |
| 2,681,147 | 6/1954 | Braswell | 210/289 |
| 3,585,130 | 6/1971 | Gregory | 210/282 |

*Primary Examiner*—Ivars C. Cintins

*Attorney, Agent, or Firm*—Edward M. Steutermann

[57] ABSTRACT

A fluid filter arrangement particularly useful in removal of selected impurities from drinking water including a hollow casing means to receive a selectively removable top end, and bottom end, defining a chamber and having an inlet in the top end for admission fluid to be treated and an outlet in the bottom end for emission of treated fluid, replaceable treating material retention means having a sidewall of generally the same shape as the inner wall of the casing so the sidewall of the retention means engages the sidewall of the casing in sealing relation where the retention means includes a concave fluid porous inlet end to be disposed in communicative relation with the fluid inlet and fluid porous outlet end opposite the inlet end communicating with the fluid outlet from the casing, where the replacable treating material means is designed to be replaced by terminating the flow of fluid to the hollow casing means by a method known in the art and removing the top end of the casing means.

4 Claims, 4 Drawing Figures

U.S. Patent    Mar. 29, 1983    Sheet 2 of 2    4,378,293

WATER FILTER

BACKGROUND OF THE INVENTION

The present invention relates to fluid treating devices and more particularly to devices for treating a liquid, for example domestic water, for removal of impurities, for example by adsorption and is a continuation in part of my copending application Ser. No. 886,246 filed Apr. 4, 1978, now abandoned.

Various prior art devices have been provided for similar treatment of domestic water but have not provided the advantageous flow characteristics of devices in accordance with the present invention.

More particularly one such prior art arrangement is shown in U.S. Pat. No. 3,184,064-Sampson which teaches a cartridge type filter unit for treatment of domestic water. In the Sampson reference a cartridge is taught where a flat based inlet is shown to a conical filter cartridge where a flat inlet diffuser is also utilized.

In devices of the type shown there is no inducement for collection of particulate matter carried in the water admitted to the devices so such particulate matter is uniformly deposited across the inlet to the cartridge to diminish flow rate and/or increase pressure to the cartridge, ultimately the device becomes plugged. In most instances the inlet openings to the device are plugged before the activity of the adsorbent, usually activated carbon, is exhausted so that in many instances the useful life of the device is not determined by the useful life of the adsorbent.

In other prior art apparatus the adsorbent is not provided in a disposable cartridge but a rechargeable filter bed holding device is provided wherein the adsorbent is recharged with loose adsorbent when exhausted. While such arrangements provide some benefits, the difficulties inherent in handling the loose adsorbent discourage use of such devices.

No device is presently known which provides a cartridge type arrangement utilizing selected adsorbent for removal of impurities from domestic water and at the same time extend the life of the cartridge closer to the extent of life of the adsorbent.

SUMMARY OF THE INVENTION

The present invention provides an economical straightforward arrangement for use in the removal of impurities from domestic water providing an optimized flow path to enhance efficiency of removal of impurities and to extend the useful life of the adsorbent by preventing or deterring plugging of the flow of water to the device.

The present invention further provides an advantageous arrangement for removal of impurities from domestic water which is easily replenished and which can be economically fabricated in large numbers so the devices are economically accessable to a majority of the population.

Briefly the present invention provides a fluid filter arrangement particularly useful in removal of selected impurities from drinking water for example by adsorption including a hollow casing of selected cross section defining a chamber and having an inlet for fluid to be treated and an outlet for treated fluid treating material retention means having a sidewall of generally the same shape as the inner wall of the casing so the sidewall of the retention means engages the sidewall of the casing in sealing relation where the retention means includes a concave fluid porous inlet end to be disposed in communicative relation with the fluid inlet and a fluid porous outlet end opposite the inlet end communicating with the fluid outlet from the casing.

This invention provides many other advantages, and has other objects which will be more clearly apparent from consideration of several enbodiments of the invention shown in the drawings. The embodiments shown in the accompanying drawings will be described in detail, illustrating the general principals of the invention but is to be understood that the detail and descriptions are not to be taken in a limiting sense, since the scope of the invention is defined by the appended claims.

Figure 3A:
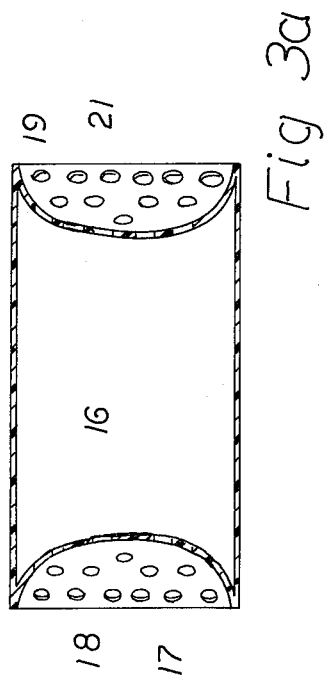
Figure 3B:
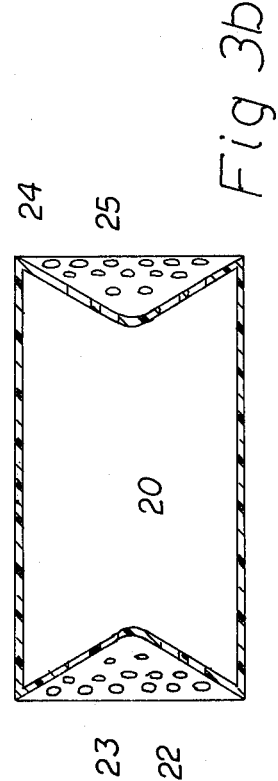
Figure 2:
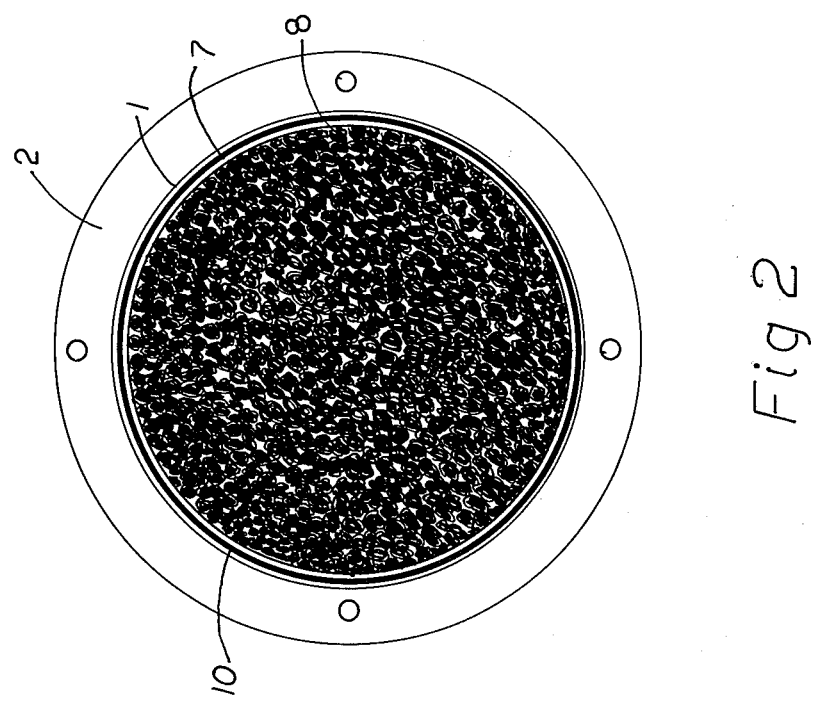

Referring to the drawings:

FIG. 1 is a view, partially in section, of one arrangement within the scope of the present invention; and FIG. 2 is a view taken along a plane passing through line 2—2 of FIG. 1; and FIG. 3 is one embodiment of a cartridge within the scope of the present invention; and FIG. 3b is another enbodiment of a cartridge within the scope of the present invention.

Referring first to FIG. 1, where a plan view partially in section is shown, the device includes a generally cylindrical casing 1 of selected diameter and length having end caps 2 and 3 where the end caps 2 and 3 include recesses 4 and 6, respectively, to receive the outer edges of cylindrical casing 1. Bolts 5 can be provided to secure the assembly. A cartridge 7, is provided which is generally cylindrical in shape with an outer diameter approximately equal to the inner diameter of casing 1 so cartridge 7 is received in sealing relation within casing 1 by removing end cap 2 and placing the cartridge 7 in casing 1. The end cap 2 is then refastened to casing 1 to ready the filter arrangement for use. It should be understood that the flow of liquid to the casing 1 is terminated while the cartridge is being replaced by means known in the art.

Cartridge 7 is filled with an adsorbent material 8, for example, granular activated carbon or other selected adsorbents. The adsorbent material is selected to remove selected impurities from a water flowing through cartridge 7. Within the scope of the present invention various adsorbents can be selected to remove selected impurities and mixed beds of adsorbents can be utilized to remove different types of impurities from the water flowing through the device. It is further recognized that the efficiency of removal of impurities from the stream of flowing water is a function, in part, of the flow rate through the device. Accordingly, the retention time of the water within the cartridge is selected by the characteristics of the cartridge and adsorbents and the maximum desired flow rate through the cartridge which is determined in part by the particle size of the adsorbent 8 as well as the exposed active surface area of the adsorbent 8, since the efficiency of adsorbtion being a function of the area of exposure of the adsorbent. In this regard it has been found that a minimum contact time of nine minutes is adequate to remove most carcinogens and mutagens based on removal of trihalomethanes. Likewise it has been found that a nine minute retention time also successfully removes odor sources such as hydrogen sulfide, from the water.

As shown in FIG. 1, end plate 2 is provided with a water inlet 9 communicating with the chamber defined by casing 1 while a fluid outlet 11 is provided in end plate 3. Within the scope of the present invention a concave inlet face 12 is provided in cartridge 7 with spaced inlet holes 13 for admission of water to the interior of cartridge 7. End plate 12 is a concave shape and defines an inlet chamber 14 in casing 1. It has been found that the advantageously concave inlet to cartridge 7 provides at least two useful functions. First, the concave shape of the inlet section provides an area for accumulation of particulate matter carried into the cartridge by means of inlet 9 to avoid unnecessary plugging of the inlet ports 13 and extends the useful life of the cartridge by preventing early "blinding" or "plugging" of inlet ports 13 prior to exhaustion of the adsorbent.

Further it has been found that the concave inlet of cartridge 7 provides turbulence dissipator area in chamber 14 so that the effect of the "start-stop" nature of the admission of water to casing 1 is minimized. The "start-stop" flow of water otherwise causes turbulent currents within which are eliminated so the flow of water is calmed prior to entering cartridge 7 and the water enters cartridge 7 uniformally over the entire inlet area to prevent a "washing" or "channelling" effect in the bed of adsorbent material in cartridge 7.

With reference to FIG. 3, a cartridge 16 is shown having a concave inlet 17 with apperatures 18 and likewise, a concave outlet 19 with apperatures 21 for emission of water. It will be recognized that the inlet portion of the device 3 is similar to the inlet of the cartridge 7 shown in FIG. 1. It is further to be recognized that the concave outlet 19 provides an arrangement where the outlet and inlet are the same shape so that it is unlikely that mistakes can be made in inserting the cartridge into a casing such as casing 1 of FIG. 1. Additionally, the concave outlet illustrated in FIG. 3 performs the function of further preventing channeling or washing in cartridge 7 inasmuch as a uniform pressure gradient is provided across the outlet 19 to prevent directional flow of water within cartridge 16.

Likewise, FIG. 4 is an illustration of an arrangement where a generally conically concave inlet 22 is provided for a cartridge 20 and includes inlet apperatures 23. Likewise a generally conically concave outlet plate 24 is provided having outlet appuratures 25 to provide the same effect as discussed with respect to the illustration of FIG. 3.

It will be recognized that various other arrangements within the scope of the present invention will become obvious to those skilled in the art upon reading of the disclosure set forth hereinbefore and the scope of the present invention is to be determined by the claims appended hereto.

The invention claimed is:

1. A fluid filter arrangement particularly useful in removing selected impurities in drinking water including a hollow casing means, removable top end, and bottom end, defining a chamber and having an inlet in said top end for admission of water to be treated and an outlet in said bottom end for emission of treated water, replaceable treating material retention means to be located within said casing means and having a sidewall of generally the same shape as the inner wall of said casing means so that the sidewall of said replaceable material retention means engages the sidewall of said casing means in sealing relation and where said replaceable material retention means includes a concave water porous, inlet end to be disposed in communicative relation with the water inlet and water porous outlet opposite said inlet end communicating with said water outlet from said casing means and selected absorbent material retained within said replaceable treating material means is replaced by terminating the flow of water to said hollow casing means and removing said top end of said casing means.

2. The invention of claim 1 wherein said inlet end is of generally hemispherical configuration.

3. The invention of claim 1 wherein said inlet end is of generally conical configuration.

4. The invention of claim 1 including sealing means surrounding a portion of the periphery of said treating material retention means to prevent leakage of water between the inside of the casing and the treating material retention means.

* * * * *